(No Model.) 3 Sheets—Sheet 3.
P. D. VAN VRADENBURG.
VEHICLE STARTER.
No. 463,959. Patented Nov. 24, 1891.
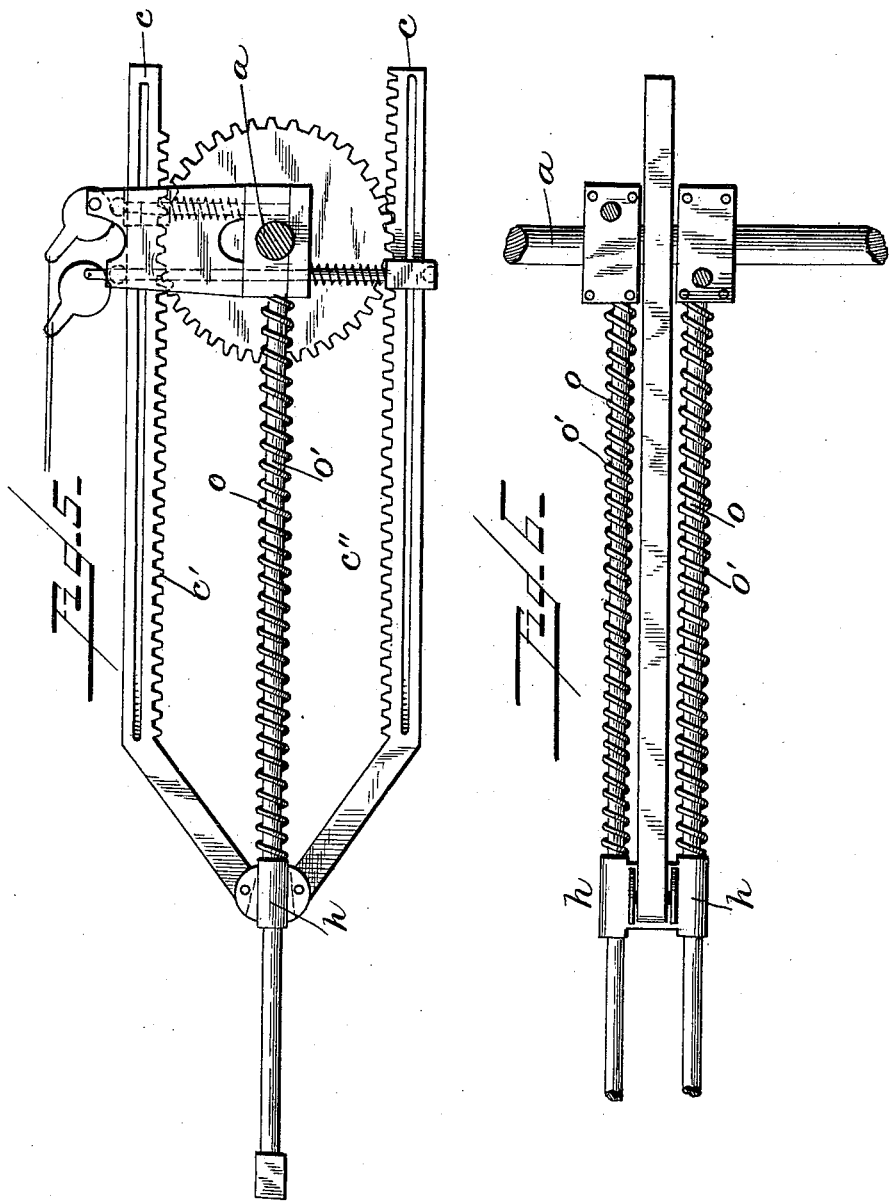
WITNESSES
F. L. Ourand
Geo. L. Wheelock
INVENTOR
Peter D. Van Vradenburg
per DuBois & DuBois
his Attorneys

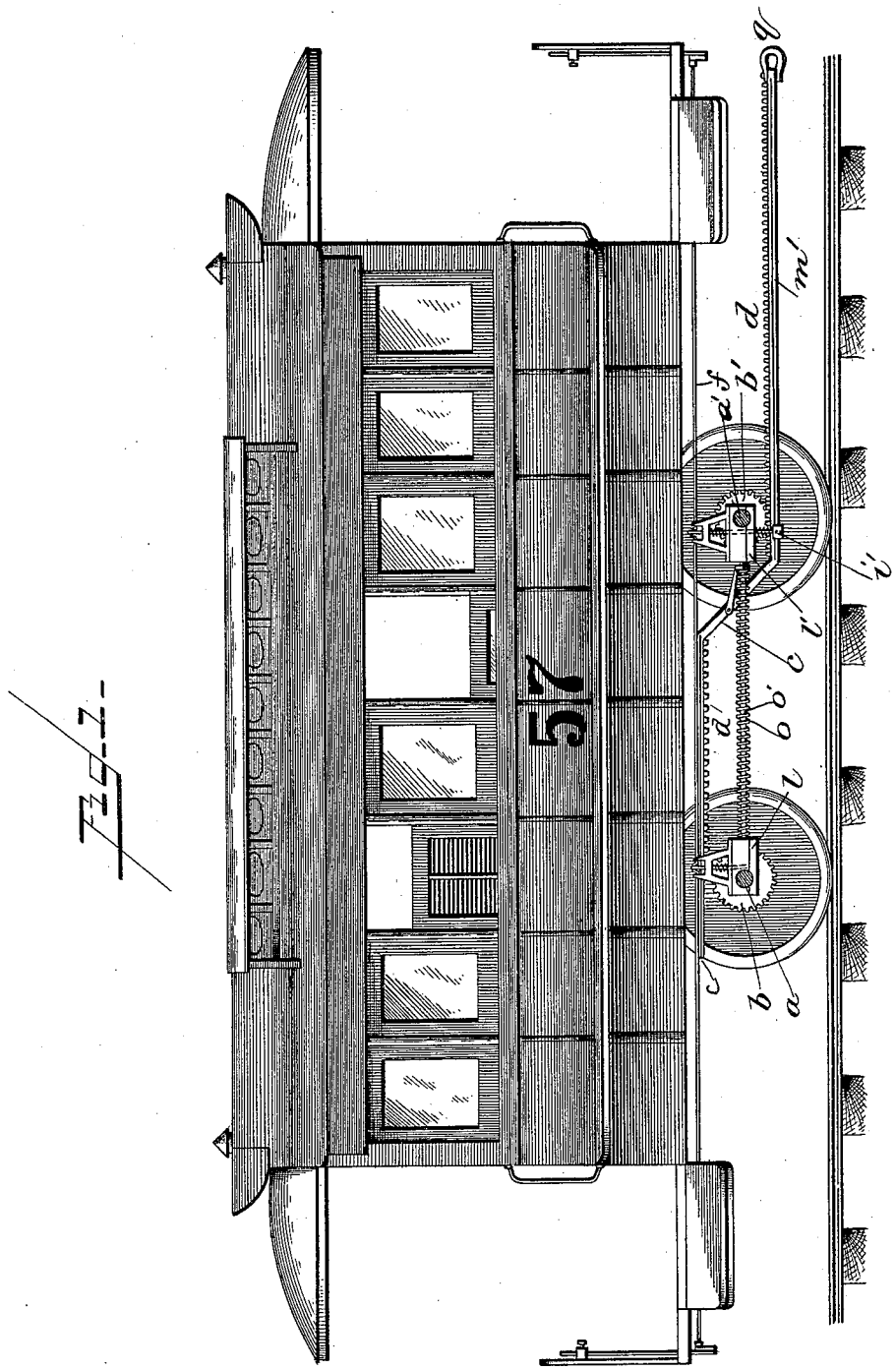

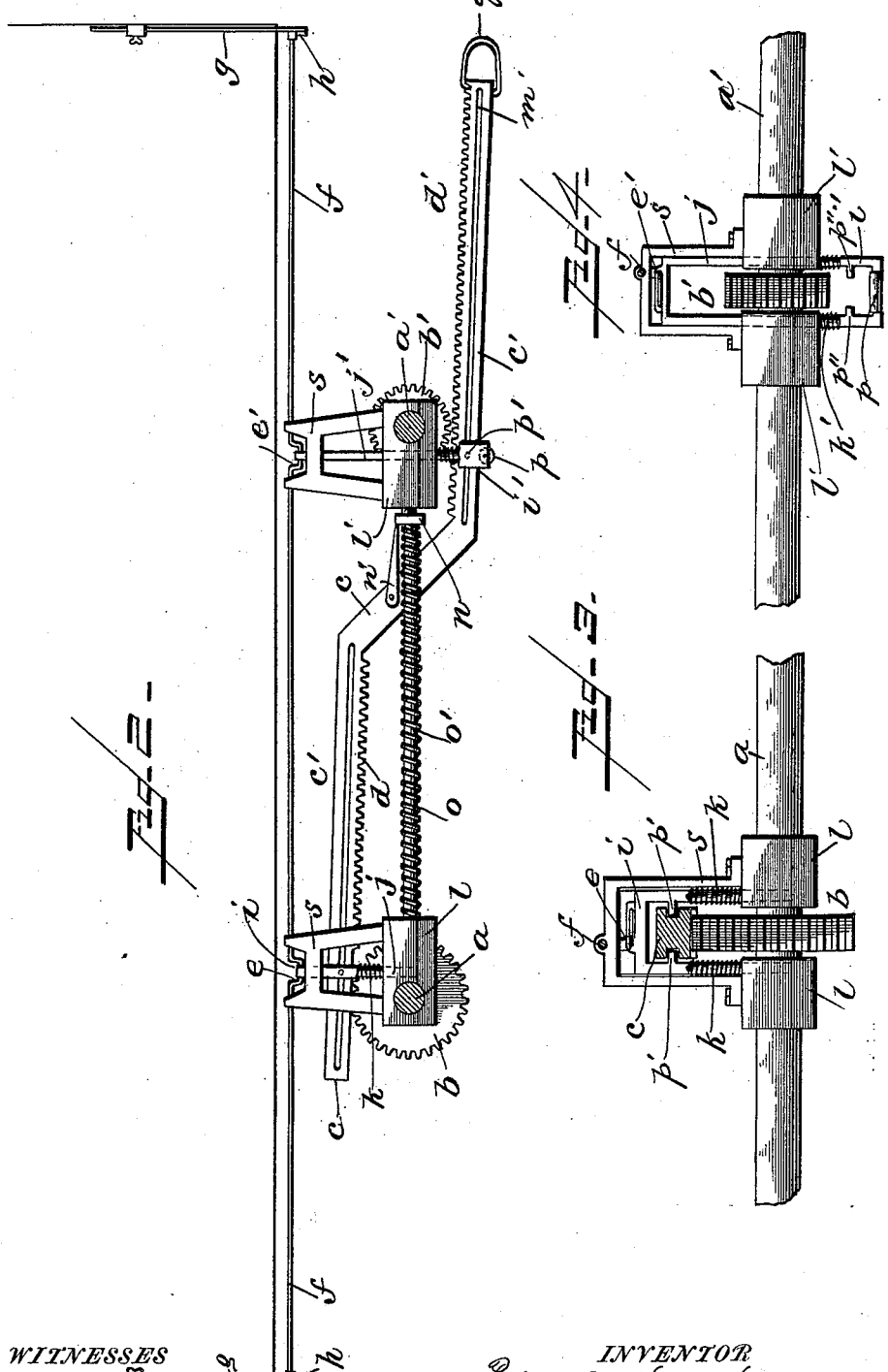
(No Model.) 3 Sheets—Sheet 2.
P. D. VAN VRADENBURG.
VEHICLE STARTER.
No. 463,959. Patented Nov. 24, 1891.

UNITED STATES PATENT OFFICE.

PETER D. VAN VRADENBURG, OF BINGHAMTON, NEW YORK.

VEHICLE-STARTER.

SPECIFICATION forming part of Letters Patent No. 463,959, dated November 24, 1891.

Application filed March 18, 1891. Serial No. 385,470. (No model.)

*To all whom it may concern:*

Be it known that I, PETER D. VAN VRADENBURG, a citizen of the United States, residing at Binghamton, in the county of Broome and State of New York, have invented certain new and useful Improvements in Mechanism for Vehicle-Starters; and I do hereby declare the following to be a full, clear, and exact description of the invention, such as will enable others skilled in the art to which it appertains to make and use the same.

My invention relates to a device adapted to vehicles of all kinds or to machinery, but more especially to street-cars; and my object is to accumulate power in stopping or checking the movement of the vehicle or machinery, so that such power can be used to give it the initial movement in starting, whereby the latter operation is greatly facilitated.

A further object of my invention is to produce a simple, cheap, durable, and easily-operated device applicable to any ordinary mechanism, and especially to the running-gear of street-cars.

With this end in view my invention consists in the peculiar features and combinations of parts more fully described hereinafter, and pointed out in the claims.

In the accompanying drawings, Figure 1 represents a side view of a horse-car to which my device is applied; Fig. 2, a similar view with parts enlarged; Fig. 3, a detail end view of the rear gear; Fig. 4, a detail end view of the front gear; Fig. 5, a modification in which a pair of pivoted racks are shown on opposite sides of a gear, both being shown in engagement and the wheel rigidly locked; and Fig. 6, a top view of the modification.

The reference-letters $a$ and $a'$ represent the front and rear axles of an ordinary horse-car to which my invention is in the present instance applied. Both of the axles are provided with gears $b\ b'$, fixed to rotate with them, and these gears are made to alternately engage front and rear racks $d$ and $d'$ upon opposite sides of a horizontally-movable compressing-bar $c$, through the medium of crank-arms $e$ and $e'$, formed in a rock-shaft $f$, extending under the platform of the car, which shaft is actuated by hand-levers $g$. The crank-arms are timed to throw one rack out of gear and the other in gear when the shaft $f$ is rocked. The rear end of bar $c$ is supported by a vertically-movable hanger $i$, guided by rods $j$, surrounded by coil-springs $k$, which springs normally hold the rack $d$ out of engagement with the gear $b$. The axles $a$ and $a'$ rotate in boxes $l$ and $l'$, and the guide-rods $j$ and $j'$ fit and move in holes bored in these boxes.

The bar $c$ is supported in the hanger $i$ by means of a pair of oppositely-located lugs $p'$, entering longitudinal grooves $m$ in the opposite sides of the bar. The front end of the bar $c$ is supported by a hanger $i'$, having guide-rods $j$ and springs $k'$, and provided with an anti-friction roller $p$ and with similar lugs $p''$, which enter grooves $m'$ upon opposite sides of the bar. The rock-shaft $f$ is centered in the top of standards $s$, supported upon the boxes $l\ l'$. A runner $n$ is connected to the bar $c$ by a rod $n'$, and this runner is adapted to compress a coil-spring $o$ around a rod $o'$, extending between the boxes $l\ l'$.

The front end of the bar $c$ is provided with a clevis $q$, so that the draft of the horse can be brought to bear directly on the wheel with which the bar $c$ is engaged in the starting operation. In the modifications shown in Figs. 5 and 6 a pair of rods $o'$ are provided with runners $n$, to which is pivoted a pair of bars $c'\ c''$, having racks adapted to alternately engage opposite sides of the gear $b$ to compress the springs $o$.

Thus constructed my invention operates as follows: When it is desired to stop the car, the rock-shaft $f$ is rotated, which throws the front rack $d'$ of the compressing-bar $c$ into engagement with the gear $b'$ and lifts the rear rack $d$ out of engagement. The rotation of the gear $b'$ moves the bar backward, thereby sliding the runner $n$ on the bar $n'$ and compressing the coil-spring $o$. Before the bar $c$ is brought into play both racks are of course thrown out of engagement with the gears $b\ b'$, so that the car-wheels are free to rotate. The crank-arms $e\ e'$ being so timed that the movement which throws the front rack into gear throws the rear one out makes the bar free to move backward when compressing the spring $o$. Now when the spring $o$ has been compressed as described and it is desired to start the vehicle, the rear rack is thrown into engagement with the rear gear *b* and front rack out of engagement with the front gear, whereupon the bar *c* will be released and moved forward by the spring *o* and its full force brought to bear in rotating the rear wheel. Thus the retractile force of the spring, together with the other motive power, makes the operation of starting much easier, thereby saving strain upon horses when they are used and upon machinery when mechanical power is employed. When the rear wheels *b b'* and the racks upon bar *c* are thrown into gear at the same time, a perfect lock is formed to hold the car in case the brakes fail.

It is evident that my invention could be varied in many slight ways that might suggest themselves to a skillful mechanic. Therefore I do not limit myself to the exact construction herein shown and described, but consider myself entitled to all such variations as come within the spirit and scope of my device.

Having thus shown the preferred form of my invention, what I claim as new, and desire to secure by Letters Patent, is—

1. In combination with the front and rear axles of a vehicle, gear-wheels fixed on said axles, a movable bar having racks upon its upper and lower edges adapted to engage the upper and lower sides of each gear, a runner secured to said bar, a rod provided with a coil-spring extending between said axles, and a device, substantially as described, for lifting the rod in and out of engagement, as set forth.

2. In combination with the front and rear axles of a vehicle, gear-wheels fixed on said axles, a movable grooved bar having racks upon its upper and lower edges adapted to engage each of said wheels, a rod extending between the axles and surrounded by a coil-spring, a runner secured to move with said rack-bar, hangers for supporting said bar, and a rock-shaft adapted to raise and lower the hangers to throw the bar in and out of engagement, in the manner and for the purpose substantially as described.

3. The combination of a movable bar provided with racks, gear-wheels secured to rotate with the axles of a vehicle and to be engaged by said bar, a rod extending between said axles and surrounded by a coil-spring, a runner embracing said rod and secured to move with the bar to compress said spring, hangers or frames adapted to raise and lower said bar, and a rock-shaft provided with crank-arms and connected with hand-levers for actuating said hangers or frames, all arranged and adapted to operate in the manner and for the purpose substantially as described.

In testimony whereof I affix my signature in presence of two witnesses.

PETER D. VAN VRADENBURG.

Witnesses:
FRANK S. ANDERSON,
J. A. BROWN.